(12) United States Patent
Mouser

(10) Patent No.: US 6,672,411 B1
(45) Date of Patent: Jan. 6, 2004

(54) CONTROL MECHANISM FOR A ZERO TURNING RADIUS VEHICLE

(75) Inventor: Bradley J. Mouser, Spring Hill, TN (US)

(73) Assignee: Murray, Inc., Brentwood, TN (US)

( * ) Notice: Subject to any disclaimer, the term of this patent is extended or adjusted under 35 U.S.C. 154(b) by 0 days.

(21) Appl. No.: 10/274,521

(22) Filed: Oct. 18, 2002

(51) Int. Cl.[7] .................................................. G05G 1/04
(52) U.S. Cl. ..................... 180/6.32; 180/6.48; 74/484 R
(58) Field of Search ................................ 180/6.2, 6.24, 180/6.26, 6.3, 6.32, 6.48, 6.5; 74/484 R, 485, 492, 422

(56) References Cited

U.S. PATENT DOCUMENTS

| | | | |
|---|---|---|---|
| 3,362,493 A | | 1/1968 | Davis ........................ 180/6.32 |
| 4,281,737 A | * | 8/1981 | Molzahn ..................... 180/307 |
| 4,541,497 A | * | 9/1985 | Riediger et al. ............ 180/6.48 |
| 4,600,075 A | * | 7/1986 | Heidner et al. .............. 180/336 |
| 4,620,575 A | * | 11/1986 | Cuba et al. ................... 180/307 |
| 5,042,238 A | | 8/1991 | White ........................... 56/11.8 |
| 5,048,638 A | * | 9/1991 | Duncan et al. ............. 180/307 |
| RE34,057 E | | 9/1992 | Middlesworth ............. 180/6.2 |
| 5,247,784 A | * | 9/1993 | Kitamura et al. ............ 56/10.8 |
| 5,584,167 A | * | 12/1996 | Hamada et al. .............. 56/11.4 |
| 5,649,606 A | | 7/1997 | Bebernes ..................... 180/307 |
| 5,850,886 A | * | 12/1998 | Kouno et al. ............... 180/6.24 |
| 5,921,142 A | | 7/1999 | Peter ............................ 74/491 |
| 6,126,564 A | * | 10/2000 | Irikura et al. .................. 475/24 |
| 6,196,342 B1 | | 3/2001 | Teal ............................. 180/6.2 |
| 6,250,414 B1 | * | 6/2001 | Sato et al. ................... 180/307 |
| 6,325,166 B1 | * | 12/2001 | Shimada et al. ........... 180/6.48 |
| 6,389,922 B1 | * | 5/2002 | Krieger ........................ 74/491 |
| 6,581,704 B2 | * | 6/2003 | Law et al. .................. 180/6.32 |
| 2002/0092685 A1 | | 7/2002 | Hauser ........................ 180/6.3 |

* cited by examiner

*Primary Examiner*—Lesley D. Morris
*Assistant Examiner*—L. Lum
(74) *Attorney, Agent, or Firm*—Kevin E. Joyce

(57) ABSTRACT

A control mechanism for a dual transmission vehicle is disclosed. First and second overlaying plates are provided, the first plate having a profiled slot which communicates with parallel slots in the second plate. The slots in the first and second plates are oriented in the direction of rectilinear movement of their respective plate. The first plate is controlled to move in a direction normal to the direction in which the second plate is controlled to move. A pair of rods connects the plates to the transmissions. Each rod has a first end joined to its respective transmission and a second end projecting through the profiled slot in the first plate and through a respective one of the parallel slots in the second plate. Dependent on the relative position of the plates, wheels connected to the transmission are driven at the same or different speeds.

14 Claims, 1 Drawing Sheet

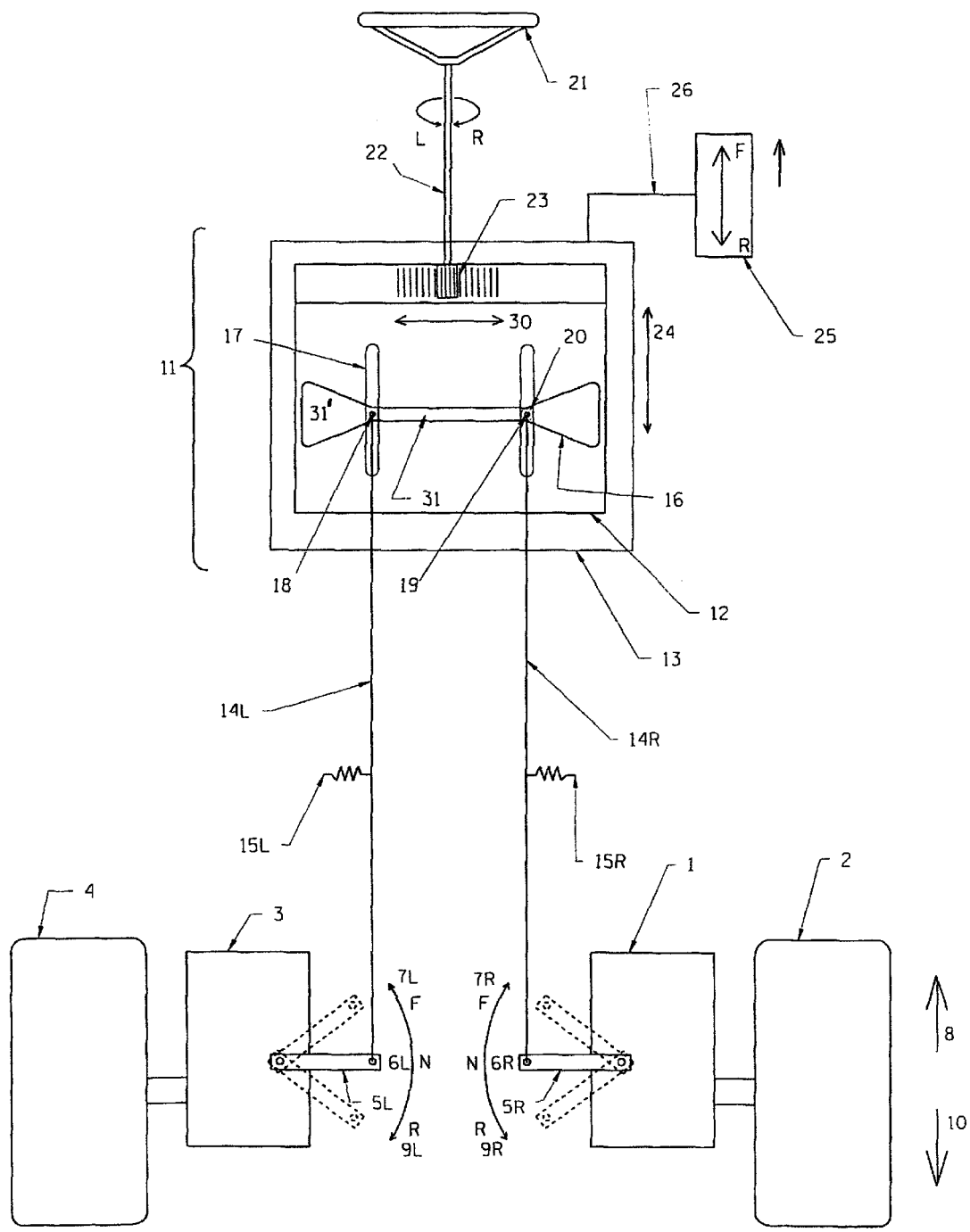

CONTROL MECHANISM FOR A ZERO TURNING RADIUS VEHICLE

BACKGROUND OF THE INVENTION

1. Field of the Invention

The present invention relates to a mechanism for controlling a dual transmission zero turning radius vehicle.

2. Prior Art

Dual transmission vehicles having a zero turning radius capability are well known. Such vehicles are frequently used, for example, as riding lawn mowers.

A conventional control arrangement for dual transmission vehicles employs two separate operator-controlled joysticks connected to the respective transmissions for controlling the speed and/or direction of drive wheels joined to the transmissions. Such mechanisms can be difficult and awkward to manipulate. Accordingly, efforts have been made to control dual transmission vehicles for zero turning radius purposes by associating transmission control with a conventional steering wheel. An example of such an arrangement is disclosed in U.S. Pat. No. 5,042,238.

SUMMARY OF THE INVENTION

The present invention represents an improved mechanism for controlling a dual transmission zero turning radius vehicle. A single control element, preferably in the form of a steering wheel, is joined through a rack and pinion arrangement to selectively rectilinearly move a first plate back and forth in a first direction. The plate's provided with a profiled slot having a major axis extending in the direction of plate movement. The first plate is positioned on overlaying relationship with a second plate operatively connected to a conventional foot-controlled pedal of the type which is pivoted about a neutral position to cause the vehicle to accelerate, either forwardly or in reverse, depending on the direction in which the pedal is pivoted. When the pedal is actuated, the second plate is moved rectilinearly in a direction substantially perpendicular to the direction of movement of the first plate. The second plate is provided with a pair of parallel slots oriented in the direction of the second plate's movement, the slots communicating with the profiled slot of the first plate.

A pair of biased connecting rods is joined at first ends thereof to respective transmissions. The opposite ends of the rods are provided with protrusions which project through the single profiled slot provided in the first plate and through respective ones of the slots formed in the second plate. Depending on the position of the protrusions relative to the slots through which they project, the vehicle's drive wheels are controlled in speed and direction.

BRIEF DESCRIPTION OF THE DRAWING

The invention now will be described in greater detail with respect to the accompanying drawing, wherein:

FIG. 1 diagrammatically illustrates the control mechanism of the present invention.

DETAILED DESCRIPTION OF A PREFERRED EMBODIMENT OF THE INVENTION

Referring to FIG. 1, each of two drive wheels is independently connected to a separate hydrostatic transmission. More particularly, a first drive transmission 1 drives a right-side drive wheel 2, and a second transmission 3 drives a left-side drive wheel 4. Each transmission is controlled by its own pivotally mounted input lever 5 which normally is located in a neutral position 6. When the lever is rotated forwardly (7), the transmission output shaft rotates in a direction to move its associated drive wheel forwardly (8) at a rotational speed proportional to the angle through which the input lever is rotated. Likewise, when the input lever is rotated backwardly (9), the transmission output shaft rotates in the opposite direction to move its associated drive wheel backwardly (10) at a speed proportional to the angle through which the input lever is rotated.

Movement of the transmission input levers is accomplished through a pair of connecting rods 14L and 14R which adjustably connect the transmission input levers 5 to a steering/control mechanism 11. These rods are provided with an adjustment means (not shown) to allow for proper adjustment of the linkage length between connecting points. In addition, the connecting rods are equipped with springs 15 biased in such a manner as to return the transmission input levers 5 to their neutral positions 6 when the rods are not acted upon by driving forces from mechanism 11.

The mechanism 11 comprises a combination of components. A first plate 12 and a second plate 13 are arranged on overlaying relationship. Plate 12 is provided with a profiled slot 16 having a major axis oriented in a direction of rectilinear movement of the plate produced by a drive arrangement which will be described hereinafter. The profiled slot has a central segment 31 of constant width. At the outer ends of the central segment, the slot increasing widens, as indicated at 31'. Plate 13 is provided with parallel slots 17 spaced by a distance not exceeding the length of the central segment 31 of slot 16 in plate 12. The slots 17 communicate with slot 16 and are oriented in a direction normal to the major axis of slot 16. The plate 13 is moved rectilinearly in the direction of slots 17 by means hereinafter to be described.

The ends of connecting rods 14 opposite those joined to the transmissions are provided with protrusions 18 and 19, respectively. The protrusions project thorough slots 16 and 17 as shown, for example, at 20.

Plate 12 is linked to a steering wheel 21 through a steering shaft 22 and gearing 23, such a rack and pinion arrangement. Plate 12 is constrained by means on the vehicle (not shown) which allows the plate to move only rectilinearly in the direction 30 when the operator turns the steering wheel from side to side. The distance by which plate 12 moves is proportional to the angle through which the steering wheel is rotated. Similarly, the plate 13 is constrained by means on the vehicle (not shown) so as to move only rectilinearly in a direction 24 normal to the direction of movement 30 of plate 12. Such movement is controlled by a conventional drive pedal 25 connected to plate 13 by a mechanical linkage 26. The drive pedal is pivotal in opposite directions about a neutral position for movement of plate 13 in a direction dependent on the direction of the pedal's pivotal displacement and by an amount dependent on the degree of the pedal's displacement.

The operation of the control mechanism first will be described with the protrusions 18 and 19 being located within the central segment 31 of plate 12 and midway along slots 17 in plate 13. When this situation exists, the pedal 25 and the transmission levers 5 are in their neutral positions, and the vehicle is at rest. Depression of the pedal causes the plate 13 to be displaced from the position illustrated. Movement of plate 13 in the direction 24 is translated by the connecting rods 14 to uniform displacement of the transmission levers from their neutral positions so as to cause the drive wheels to rotate in the same direction and at the same speed. The direction and speed of rotation are dependent on the direction and amount of displacement of plate 13 caused by the depression of pedal 25.

If, in addition to depression of pedal 25, the steering wheel 21 also is turned, the vehicle will no longer move in a straight direction. This will be explained in terms of a left hand turn occurring during forward movement. It will be understood that the same principles will apply when making right hand turns and while driving in reverse when making left or right hand turns.

As the operator begins to turn steering wheel 21 to the left, plate 12 moves to the right. This movement of plate 12 results in the protrusion 18, which previously had been within central segment 31, progressively moving along the widening profile in slot 16 under the influence of the spring 15 associated with the connecting rod 14 of which protrusion 18 is a part. The direction of movement of protrusion 18 is opposite to the movement of plate 13 imparted by depression of the pedal 25. The movement of protrusion 18 allows the lever 5 of the left side transmission 3 to move towards the neutral position 6, thus slowing the rotational speed of the left drive wheel 4. At the same time, the rotational speed of the right drive wheel 2 remains unchanged. The farther steering wheel 21 is turned, the slower will be the speed of wheel 4. When the wheel 21 is turned sufficiently, the lever 5 associated with transmission 3 reaches the neutral position 6 as a result of the protrusion 18 reaching the end of the widened profile segment in plate 12. The wheel 4 therefore stops rotating while the right hand drive wheel continues to rotate at the speed determined by the depression of pedal 25. The vehicle therefore pivots about the center of the non-driven wheel providing a zero radius turn to the left. On straightening the steering wheel 21, the protrusion 18 returns to the central segment of slot 16, and wheels 3 and 4 again rotate at the same speed as the vehicle moves in a straight direction.

The control mechanism just described provides features not obtained with other zero turn radius mechanisms. For example, the present mechanism does not allow movement of the vehicle until the operator depresses the pedal 25 in either the forward or reverse direction. Thus, unlike some existing mechanisms, the invention cannot produce an unexpected zero radius turn simply by turning just the steering wheel. The design also prevents the possibility of the left and right transmissions being thrown into opposite drive positions at the same time, because unlike other existing mechanisms, the zero radius turn is not produced in the present invention by reversing one wheel while the other is rotating in the opposite direction. Thus, extensive turf damage caused by oppositely rotating wheels is avoided. Moreover, the present mechanism allows the vehicle to turn about the center of either drive wheel when performing a zero radius turn, the vehicle turning radii being measured outwardly from the outside surface of the inside rear wheel along a line extending through the axis of the drive axle.

While the invention has been described with respect to the use of dual hydrostatic transmissions, mechanical transmissions also could be employed. Additionally, instead of using a steering wheel, a single lever, or joystick, could be used to displace the first plate, and a separate forward/reverse speed control pedal could serve to selectively displace the second plate.

What is claimed is:

1. A control mechanism for a vehicle having dual transmissions for operating respective drive wheels, said mechanism comprising:

a control element for displacing a first plate rectilinearly in a first direction, said plate having a profiled slot formed therein, said slot having a major axis extending in the direction of rectilinear displacement of the first plate;

an additional control element for displacing a second plate rectilinearly in a second direction substantially perpendicular to the direction of displacement of the first plate, said first and second plates being positioned in an overlaying relationship, the second plate being provided with a pair of parallel slots extending in the direction of rectilinear displacement of the second plate and positioned in communication with the slot in said first plate; and a pair of connecting rods extending between said second plate and the transmissions, said rods each having a first end connected to a respective transmission and a protrusion at its opposite end projecting through a respective slot in the second plate and the profiled slot in the first plate.

2. A control mechanism according to claim 1, wherein said connecting rods are biased such that their respective transmissions are normally in a neutral non-driving position.

3. A control mechanism according to claim 1, wherein said profiled slot in the first plate has a central segment of uniform width and outer segments at opposite ends of the central segment have increasingly wider widths.

4. A control mechanism according to claim 3, wherein the central segment is at least as long as spacing between the parallel slots in the second plate.

5. A control mechanism according to claim 2, wherein said profiled slot in the first plate has a central segment of uniform width and outer segments at opposite ends of the central segment having increasingly wider widths.

6. A control mechanism according to claim 5, wherein the central segment is at least as long as spacing between the parallel slots in the second plate.

7. A control mechanism according to claim 1, wherein said control element for displacing the first plate is a steering wheel operatively connected to the first plate.

8. A control mechanism according to claim 1, wherein said additional control element for displacing the second plate is a single speed/direction control pedal.

9. A control mechanism according to claim 7, wherein said additional control element for displacing the second plate is a single speed/direction control pedal.

10. A control mechanism according to claim 7, wherein said profiled slot in the first plate has a central segment of uniform width and outer segments at opposite ends of the central segment have increasingly wider widths.

11. A control mechanism according to claim 10, wherein the central segment is at least as long as spacing between the parallel slots in the second plate.

12. A control mechanism according to claim 8, wherein said profiled slot in the first plate has a central segment of uniform width and outer segments at opposite ends of the central segment have increasingly wider widths.

13. A control mechanism according to claim 12, wherein the central segment is at least as long as spacing between the parallel slots in the second plate.

14. A control mechanism according to claim 13, wherein said connecting rods are biased such that their respective transmissions are normally in a neutral non-driving position.

* * * * *